(12) United States Patent
Majila et al.

(10) Patent No.: US 12,126,535 B2
(45) Date of Patent: Oct. 22, 2024

(54) POLICY SYNTHESIS TO ENFORCE GROUP-BASED POLICIES TO UNKNOWN FLOWS

(71) Applicant: Hewlett Packard Enterprise Development LP, Houston, TX (US)

(72) Inventors: Rajib Majila, Bangalore (IN); Ram lakhan Patel, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 398 days.

(21) Appl. No.: 17/498,029

(22) Filed: Oct. 11, 2021

(65) Prior Publication Data
US 2023/0113466 A1  Apr. 13, 2023

(51) Int. Cl.
| | | |
|---|---|---|
| H04L 29/06 | (2006.01) | |
| G06F 15/16 | (2006.01) | |
| G06F 17/13 | (2006.01) | |
| G06Q 30/00 | (2023.01) | |
| H04B 17/318 | (2015.01) | |
| H04L 29/08 | (2006.01) | |
| H04L 47/20 | (2022.01) | |

(52) U.S. Cl.
CPC .................... H04L 47/20 (2013.01)

(58) Field of Classification Search
CPC ..... H04L 47/20; H04L 43/045; H04L 41/046; H04L 1/242; H04L 45/306; H04L 61/5007; H04L 63/06; H04L 9/0866; H04L 67/16; H04L 67/148; H04L 67/12; H04L 69/16; G06F 16/122; G06F 21/53; G06N 99/00; G06T 11/206; H04J 3/14; H04W 72/085; H04W 76/021; H04W 72/54; H04W 84/18; H04W 4/00; H04W 4/50; H04W 48/20; H04W 8/005; G16B 30/00; G16B 30/10; G16B 30/20; H04B 17/318
USPC ........................................................ 370/400
See application file for complete search history.

(56) References Cited

U.S. PATENT DOCUMENTS

| | | | | |
|---|---|---|---|---|
| 11,483,317 | B1* | 10/2022 | Bolignano | ............ G06F 21/577 |
| 2009/0248881 | A1* | 10/2009 | Guo | .................... H04L 12/1818 |
| | | | | 709/227 |
| 2010/0262624 | A1* | 10/2010 | Pullikottil | ........... G06F 16/2272 |
| | | | | 707/E17.108 |
| 2014/0297356 | A1* | 10/2014 | Jayade | ............. G06Q 10/06316 |
| | | | | 705/317 |

(Continued)

Primary Examiner — Edan Orgad
Assistant Examiner — Vanneilian Lalchinthang
(74) Attorney, Agent, or Firm — Park, Vaughan, Fleming & Dowler LLP

(57) ABSTRACT

A system determines a first set of policies, wherein at least one policy entry for a destination role comprises a source role, a traffic attribute, and an action to be taken for the packet. The system represents the policies as a matrix, wherein a first entry in the matrix indicates the source and destination role, the traffic attribute, and the action of the at least one policy entry. The system replaces, in the first entry, the action with the destination role if the action indicates to allow the packet, and with a null value if the action indicates to deny the packet, to obtain a first data structure with entries indicating, for a respective source role, traffic attributes and corresponding sets of allowed destination roles. The system resolves an overlapping pair comprising a first and a second traffic attribute to obtain a second set of synthesized policies.

20 Claims, 10 Drawing Sheets

(56) References Cited

U.S. PATENT DOCUMENTS

| | | | |
|---|---|---|---|
| 2016/0019339 A1* | 1/2016 | Sazonov | G16B 30/00 |
| | | | 702/20 |
| 2016/0330125 A1* | 11/2016 | Mekkattuparamban | ..................... |
| | | | H04L 45/32 |
| 2016/0359913 A1* | 12/2016 | Gupta | H04L 63/1416 |
| 2017/0006117 A1* | 1/2017 | Kafle | H04L 65/612 |
| 2021/0029174 A1* | 1/2021 | Kunduru | H04L 63/20 |
| 2022/0045958 A1* | 2/2022 | Krishnamurthy | H04L 41/0894 |
| 2022/0164889 A1* | 5/2022 | Cottrell | G06Q 40/08 |
| 2022/0400113 A1* | 12/2022 | Sreedhar | H04L 43/0876 |

\* cited by examiner

| POLICY 201 | ASSOCIATED DESTINATION ROLE 202 | POLICY ENTRIES 203 |
|---|---|---|
| P1 | FINANCE 204 | 10 Source Role Admin, Destination Role Finance, IP Protocol TCP, L4 Port 10-100 is Allowed |
| | | 20 Source Role Any, Destination Role Finance, IP Protocol TCP Traffic, L4 Port 80 is Allowed |
| P2 | ADMIN 205 | 10 Source Role Finance, Destination Role Admin, IP Protocol TCP, L4 Port 80 is Denied |
| | | 20 Source Role Any, Destination Role Admin, IP Protocol TCP, L4 Port 10-1000 is Allowed |
| P3 | SECURITY 206 | 10 Source Role Admin, Destination Role Security, IP Protocol UDP, L4 Port Any is Denied |
| | | 20 Source Role Security, Destination Role Security, IP Protocol TCP, L4 Port 90 is Denied |
| | | 30 Source Role Any, Destination Role Security, IP Protocol Any, L4 Port Any is Allowed |

Table 210:

| | ADMIN 211 | SECURITY 212 | FINANCE 213 |
|---|---|---|---|
| FINANCE 214 | 10 IP Protocol TCP, L4 Port 10-100 Allowed<br>20 IP Protocol TCP Traffic, L4 Port 80, Allowed | 20 IP Protocol TCP, L4 Port 80, Allowed | 20 IP Protocol TCP Traffic, L4 Port 80, Allowed |
| ADMIN 215 | | 20 IP Protocol TCP, L4 Port 10-1000, Allowed | 10 IP Protocol TCP, L4 Port 80, Denied<br>20 IP Protocol TCP, L4 Port 10-1000, Allowed |
| SECURITY 216 | 10 IP Protocol UDP, L4 Port Any, Denied<br>30 IP Protocol Any, L4 Port Any, Allowed | 30 IP Protocol Any, L4 Port Any, Allowed<br>20 IP Protocol TCP, L4 Port 90, Denied — ENTRY 217 | 30 IP Protocol Any, L4 Port Any, Allowed |

FIG. 2C

Table 220:

| | FINANCE 221 | ADMIN 222 | SECURITY 223 |
|---|---|---|---|
| ADMIN 224 | 10 IP Protocol TCP, L4 Port 10-100 Allowed<br>20 IP Protocol TCP Traffic, L4 Port 80, Allowed | 20 IP Protocol TCP, L4 Port 10-1000, Allowed | 10 IP Protocol UDP, L4 Port Any, Denied — ENTRY 227<br>30 IP Protocol Any, L4 Port Any, Allowed |
| SECURITY 225 | 20 IP Protocol TCP, L4 Port 80, Allowed | 20 IP Protocol TCP, L4 Port 10-1000, Allowed | 30 IP Protocol Any, L4 Port Any, Allowed<br>20 IP Protocol TCP, L4 Port 90, Denied |
| FINANCE 226 | 20 IP Protocol TCP Traffic, L4 Port 80, Allowed | 10 IP Protocol TCP, L4 Port 80, Denied<br>20 IP Protocol TCP, L4 Port 10-1000, Allowed | 30 IP Protocol Any, L4 Port Any, Allowed |

230

| SOURCE ROLE 231 | MATCH ELEMENT 232 | ALLOWED DESTINATION ROLE SET 233 |
|---|---|---|
| ADMIN 234 | 10 IP Protocol TCP, L4 Port 10-100<br>20 IP Protocol TCP Traffic, L4 Port 80<br>20 IP Protocol TCP, L4 Port 10-1000<br>10 IP Protocol UDP, L4 Port Any<br>30 IP Protocol Any, L4 Port Any | {Finance}<br>{Finance}<br>{Admin}<br>{ }<br>{Security} |
| SECURITY 235 | 20 IP Protocol TCP Traffic, L4 Port 80<br>20 IP Protocol TCP, L4 Port 10-1000<br>30 IP Protocol Any, L4 Port Any  — 237<br>20 IP Protocol TCP, L4 Port 90 | {Finance}<br>{Admin}<br>{Security}<br>{ } |
| FINANCE 236 | 20 IP Protocol TCP Traffic, L4 Port 80<br>10 IP Protocol TCP, L4 Port 80<br>20 IP Protocol TCP, L4 Port 10-1000<br>30 IP Protocol Any, L4 Port Any | {Finance}<br>{ }<br>{Admin}<br>{Security} |

| SOURCE ROLE 241 | MATCH ELEMENT 242 | ALLOWED DESTINATION ROLE SET 243 |
|---|---|---|
| ADMIN 244 | 10 IP Protocol TCP, L4 Port 10-100<br>20 IP Protocol TCP Traffic, L4 Port 80-80<br>20 IP Protocol TCP, L4 Port 10-1000<br>10 IP Protocol UDP, L4 Port 1-65535<br>30 IP Protocol 1-255, L4 Port 1-65535 | {Finance, Admin}<br>{Finance, Admin}<br>{Admin}<br>{Admin}<br>{Security, Admin} |
| SECURITY 245 | 20 IP Protocol TCP Traffic, L4 Port 80<br>20 IP Protocol TCP, L4 Port 10-1000<br>30 IP Protocol 1-255, L4 Port 1-65535  — 247<br>20 IP Protocol TCP, L4 Port 90 | {Finance, Security}<br>{Admin, Security}<br>{Security}<br>{ } |
| FINANCE 246 | 20 IP Protocol TCP Traffic, L4 Port 80-80<br>10 IP Protocol TCP, L4 Port 80-80<br>20 IP Protocol TCP, L4 Port 10-1000<br>30 IP Protocol 1-255, L4 Port 1-65535 | {Finance}<br>{Finance}<br>{Admin, Finance}<br>{Security, Finance} |

| SOURCE ROLE 251 | MATCH ELEMENT 252 | ALLOWED DESTINATION ROLE SET 253 |
|---|---|---|
| ADMIN 254 | IP Protocol TCP, L4 Port 0-9 | {Security, Admin} |
| | IP Protocol TCP Traffic, L4 Port 10-10 | {Finance, Security, Admin} |
| | IP Protocol TCP, L4 Port 11-79 | {Finance, Security, Admin} |
| | IP Protocol TCP, L4 Port 80-80 | {Finance, Security, Admin} |
| | IP Protocol TCP, L4 Port 81-99 | {Finance, Security, Admin} |
| | IP Protocol TCP, L4 Port 100-100 | {Finance, Security, Admin} |
| | IP Protocol TCP, L4 Port 101-999 | {Security, Admin} |
| | IP Protocol TCP, L4 Port 1000-1000 | {Security, Admin} |
| | IP Protocol TCP, L4 Port 1001-65535 | {Security, Admin} |
| | IP Protocol UDP, L4 Port 1-65535 | {Security, Admin} |
| | IP Protocol Any, L4 Port Any | {Admin} |

FIG. 2F

| SOURCE ROLE 261 | MATCH ELEMENT 262 | ALLOWED DESTINATION ROLE SET 263 |
|---|---|---|
| ADMIN 264 | 10 IP Protocol TCP, L4 Port 0-9<br>20 IP Protocol TCP Traffic, L4 Port 10-100<br>30 IP Protocol TCP, L4 Port 101-65535<br>40 IP Protocol UDP, L4 Port Any<br>50 IP Protocol Any, L4 Port Any | {Security, Admin}<br>{Finance, Admin, Security}<br>{Admin, Security}<br>{Security, Admin}<br>{Admin} |
| SECURITY 265 | 10 IP Protocol TCP Traffic, L4 Port 0-9<br>20 IP Protocol TCP, L4 Port 10-79<br>30 IP Protocol Any, L4 Port 80-80<br>40 IP Protocol TCP, L4 Port 81-89<br>50 IP Protocol TCP, L4 Port 90-90<br>60 IP Protocol TCP, L4 Port 91-1000<br>70 IP Protocol TCP, L4 Port 1001-65535<br>80 IP Protocol Any, L4 Port Any | {Security}<br>{Admin, Security}<br>{Security, Finance, Admin}<br>{Admin, Security}<br>{Admin}<br>{Admin, Security}<br>{Security}<br>{Security} |
| FINANCE 266 | 10 IP Protocol TCP Traffic, L4 Port 0-9<br>20 IP Protocol TCP, L4 Port 10-79<br>30 IP Protocol TCP, L4 Port 80-80<br>40 IP Protocol TCP, L4 Port 81-1000<br>50 IP Protocol TCP, L4 Port 1001-65535<br>60 IP Protocol Any, L4 Port Any | {Finance, Security}<br>{Finance, Admin, Security}<br>{Security, Finance}<br>{Finance, Admin, Security}<br>{Security, Finance}<br>{Security, Finance} |

POLICY SYNTHESIS TO ENFORCE GROUP-BASED POLICIES TO UNKNOWN FLOWS

BACKGROUND

Field

This disclosure is generally related to the field of data management. More specifically, this disclosure is related to a method and system for policy synthesis to enforce group-based policies to unknown flows.

BRIEF DESCRIPTION OF THE FIGURES

FIG. 2A illustrates a table with user-configured group-based policies (GBPs), in accordance with an aspect of the present application.

FIG. 2B illustrates a table which indicates the user-configured GBPs in a matrix, in accordance with an aspect of the present application.

FIG. 2C illustrates a table which indicates the user-configured GBPs in a matrix based on a transposed form associated with FIG. 2B, in accordance with an aspect of the present application.

FIG. 2D illustrates a table which indicates a policy set with transformed actions, in accordance with an aspect of the present application.

FIG. 2E illustrates a table corresponding to FIG. 2D, including wildcard expansion and overlap detection of entries, in accordance with an aspect of the present application.

FIG. 2F illustrates a table corresponding to FIG. 2E, including implosion and pruning of entries for the source role of "Admin," in accordance with an aspect of the present application.

FIG. 2G illustrates a table of synthesized policies based on the user-configured policies of FIG. 2A and the result of the processing depicted in FIGS. 2B-2F, in accordance with an aspect of the present application.

In the figures, like reference numerals refer to the same figure elements.

DETAILED DESCRIPTION

Figure 1:
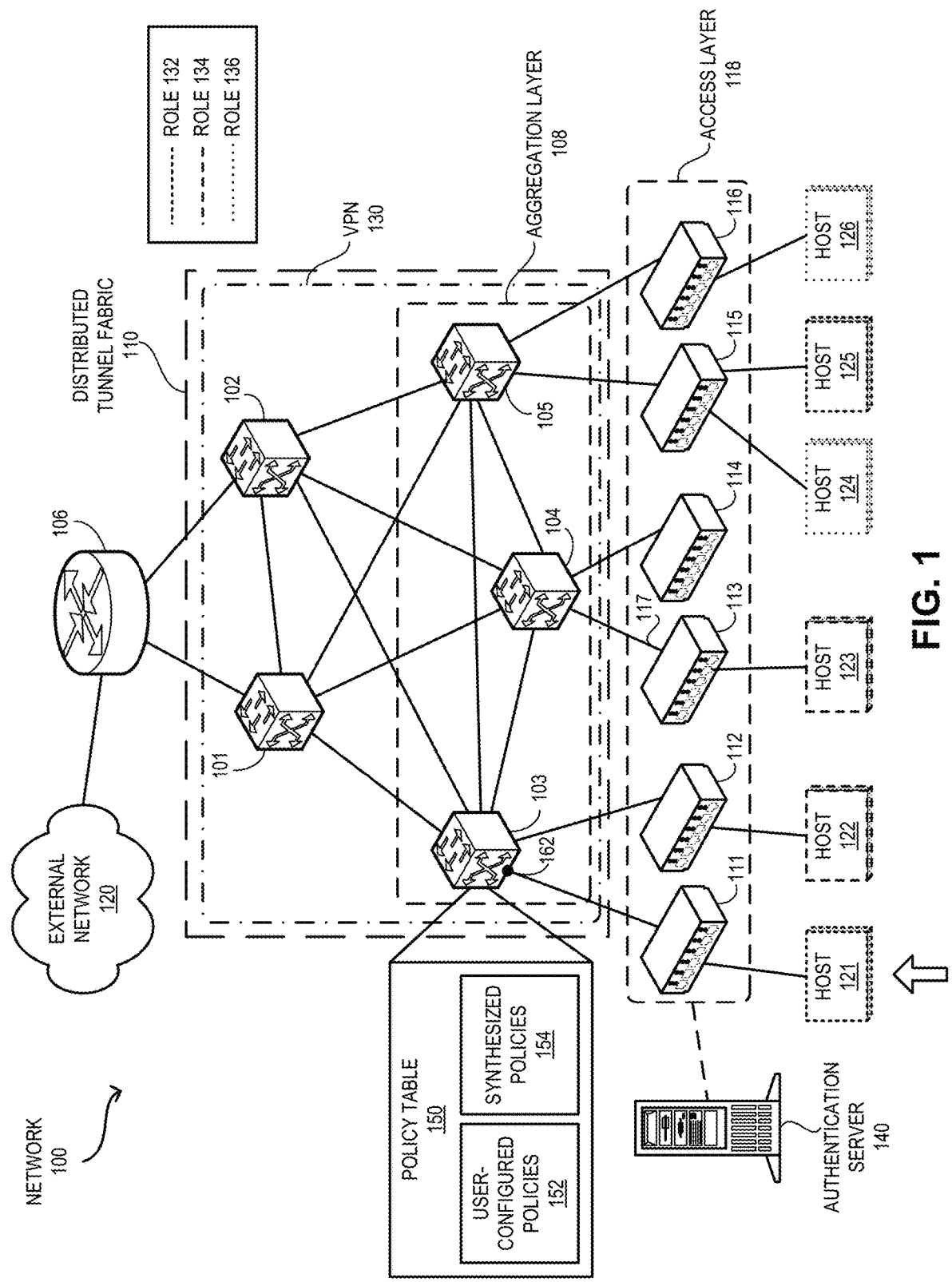
FIG. 1 illustrates a network which facilitates policy enforcement based on source roles, in accordance with an aspect of the present application.

The following description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

Internet is the delivery medium for a variety of applications running on physical and virtual devices. These applications bring with them an increasing traffic demand. As a result, equipment vendors continue to be build switches with versatile capabilities. For example, network segmentation can be used to isolate user traffic and reduce the broadcast domain in a network. Traditionally, local virtual local area networks (VLANs) have been used to segment network traffic at L2, and IP sub-domains have been used to segment network traffic at L3. Traditional network segmentation at the edge (e.g., at a switch or access point where clients can be directly attached to the switch which is enforcing a role-based policy) can face some challenges, such as: the integration of traditional wire and wireless infrastructures; the ever-increasing number of mobile devices in a network; and the deployment of Internet-of-Things (IoT) devices in large numbers. Furthermore, in scaling a network, it may be challenging to support a large mix of devices with different levels of access requirements and threat perception as well as traditional manual and static configurations using internet protocol (IP)-subnets an access control lists (ACLs).

Group-based policies (GBPs) can provide a solution for dynamic network segmentation. GBPs can allow a network administrator to configure policies which define permissible traffic patterns across or within user roles. A GBP can be configured as a policy between a pair of source and destination roles, and can help in both micro-segmentation (in a same subnet) and macro-segmentation (across different subnets). The system can profile the sender of a packet at the ingress node and carry the profiling information using a transport encapsulation. In scenarios where the destination of the packet is known, segmentation using GBPs can work efficiently.

However, in some scenarios, the destination of the packet may be unknown. For example, a multi-destination packet (or broadcast, unknown-unicast, or multicast (BUM) traffic) may be addressed in such a way that a switch may not be able to determine a destination host. The destination address of such a packet can be, e.g., a multicast address, which does not indicate an individual destination host. As a result, the packet may not have a corresponding destination role. Consequently, determining whether to forward the packet to a local host based on GBPs can be challenging for the switch.

The described aspects provide a solution for enforcing GBPs to unknown flows by taking an original set of user-configured policies (which take as input a source role, a destination role, and traffic attributes to output an action of allow/deny for a packet) and synthesizing a set of policies based on the user-configured policies. The resulting set of synthesized policies can take as input a source role and traffic attributes and can output a list of allowed destination roles. Thus, a "first decision model" based on the user-configured policies can yield a same result for a given incoming packet as a "second decision model" based on the synthesized policies (also referred to as equivalent decision models). The second decision model can allow the system to enforce GBPs in the scenario of unknown destination roles or flows (as in BUM traffic).

In this disclosure, the term "switch" is used in a generic sense, and it can refer to any standalone or fabric switch operating in any network layer. "Switch" should not be interpreted as limiting aspects of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting aspects of the present invention to layer-3 networks. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

Policy Enforcement in an Overlay Topology

A switch may support different protocols and services. For example, the switch can support tunneling and virtual private networks (VPNs). The switch can then facilitate overlay routing for a VPN over the tunnels. For example, an Ethernet VPN (EVPN) can be deployed as an overlay over a set of virtual extensible local area networks (VXLANs).

To deploy a VPN over the tunnels, a respective tunnel endpoint may map a respective client virtual local area network (VLAN) to a corresponding tunnel network identifier (TNI), which can identify a virtual network for a tunnel. The TNI may appear in a tunnel header that encapsulates a packet and is used for forwarding the encapsulated packet via a tunnel. For example, if the tunnel is formed based on VXLAN, the TNI can be a virtual network identifier (VNI) of a VXLAN header, and a tunnel endpoint can be a VXLAN tunnel endpoint (VTEP). A TNI can also be mapped to the virtual routing and forwarding (VRF) associated with the tunnels if the layer-3 routing and forwarding are needed.

The VPN can be deployed over tunnels formed among the backbone (or non-access) switches of a network. For example, if a network includes core, aggregation, and access switches, the core and aggregation switches of the network can be referred to as the backbone switches. The set of tunnels among the backbone switches can form an overlay tunnel fabric. In other words, the backbone switches of the tunnel fabric can operate as the tunnel endpoints and facilitate routing over the tunnels. On the other hand, the access switches can receive the packets from hosts (or client devices) and facilitate the packet distribution underlay. Since a VPN can be distributed across the tunnel fabric, a VPN over the tunnel fabric can also be referred to as a distributed tunnel fabric.

FIG. 1 illustrates a network which facilitates policy enforcement based on source roles, in accordance with an aspect of the present application. A network 100 can include a number of switches and devices. Network 100 can be an Ethernet, InfiniBand, or other networks, and may use a corresponding communication protocol, such as Internet Protocol (IP), FibreChannel over Ethernet (FCoE), or other protocol. Network 100 can include a distributed tunnel fabric 110 comprising switches 101, 102, 103, 104, and 105. Switches 101 and 102 of fabric 110 can be coupled to a core switch 106. Fabric 110 can be coupled to an external network 120 via switch 106 (e.g., a layer-3 router).

In FIG. 1, a respective link in fabric 110 can be a tunnel. Switches of fabric 110 may form a mesh of tunnels. Examples of a tunnel include, but are not limited to, VXLAN, Generic Routing Encapsulation (GRE), Network Virtualization using GRE (NVGRE), Generic Networking Virtualization Encapsulation (Geneve), Internet Protocol Security (IPsec). A VPN 130, such as an EVPN, can be deployed over fabric 110. Fabric 110 can include an aggregation layer 108, which can include aggregate switches 103, 104, and 105. A respective aggregate switch can aggregate traffic from one or more downstream access switches.

Furthermore, aggregate switches 103, 104, and 105 can be coupled to an access layer 118, which can include access switches 111, 112, 113, 114, 115, and 116. Access layer 118 can facilitate access to fabric 110 to a number hosts 122, 123, 124, 125, and 126. Examples of hosts can include, but are not limited to, laptops, desktops, printers, cellphones, tablets, IoT devices, and appliances. Access switch 115 can provide access coverage to hosts 124 and 125. Similarly, access switches 111, 112, 113, and 116 can provide access coverage to hosts 121, 122, 123, and 126, respectively. In this example, access switches 113 and 114 can be coupled to aggregate switch 104 to forward traffic to fabric 110. Consequently, the packets forwarded by access switch 113 can enter fabric 110 via aggregate switch 104.

With existing technologies, when host 123 joins the coverage of access switch 113, access switch 113 can authenticate host 123 from an authentication server 140. The authentication of host 123 can be based on an authentication process supported by access layer 118. For example, the authentication process can be based on a port-based (e.g., IEEE 802.1X) or username/password-based authentication. If host 123 is successfully authenticated by authentication server 140, access switch 113 can determine a host role 134 of host 123 and allocate a VLAN to host 123 based on the host role. Host role 134 may be provided by authentication server 140 and can indicate the affiliation between a user of host 123 and the entity associated with VPN 130. Host role 134 can indicate one or more of: a department of the user of host 123; a level of access granted to the user; and a domain of communication for host 123.

For example, if host 123 is associated with a user with administrative privilege, role 134 can be an administrator role. On the other hand, if host 123 is associated with a guest user, role 134 can be a guest role. In the same way, corresponding access switches of access layer 118 can determine role 132 for hosts 121 and 125, role 134 for host 122, and role 136 for hosts 124 and 126. The roles can thus define policies for accessing and forwarding traffic in fabric 110 instead of the physical location of the hosts or switches. By associating host 123 to role 134, host 123 can be allocated to a group of hosts belonging to role 134. A host may be associated with one or more groups. A user (e.g., an administrator) can then configure GBPs for fabric 110 to facilitate segmentation of traffic based on roles 132, 134, and 136 as determined during the authentication process. The GBPs thus allow the administrator to configure policies that define permissible traffic patterns across roles 132, 134, and 136 in fabric 110.

In fabric 110, the GBPs can be deployed at the egress switches without distributing them across fabric 110. For example, for packets received via tunnels, switch 103 can operate as a policy-enforcement switch and maintain a policy table 150 comprising a set of policies (e.g., GBPs or user-configured policies) 152 defined based on the source and destination roles. A respective policy or GBP in policies 152 can indicate whether a class of traffic (e.g., with certain traffic attributes) from a source role is allowed or permitted to be forwarded to a destination role. For example, a GBP can indicate whether role 134 is permitted to receive Transmission Control Protocol (TCP) traffic from role 132 at port 80. Since switch 103 can act as an egress switch for a packet received via a tunnel, switch 103 can determine the destination role for the packet. Furthermore, switch 103 may only enable a policy associated with a role if a host with that role is detected at a port of switch 103. In this way, switch 103 can efficiently enforce GBPs in fabric 110.

In another example, upon successful authentication of host 125, host 125 can send a packet to host 122. Access switch 115 can receive the packet and forward it to fabric 110. Ingress switch 105 can receive the packet and determine the source role (i.e., role 132 of source host 125) associated with the packet. Switch 105 can also determine a TNI (e.g., a VNI) corresponding to the VLAN of the packet. Switch 105 can further determine a remote tunnel endpoint, such as switch 103, in fabric 110 based on the header information of the packet. Switch 105 can maintain a mapping between the VLAN and the TNI for determining the TNI. Switch 105 can then encapsulate the packet (e.g., with a group policy object (GPO) encapsulation) with a tunnel header with the TNI, a destination address corresponding to switch 103, and the source role. Subsequently, switch 105 can forward the encapsulated packet via the tunnel to switch 103. To identify switch 103 as the remote tunnel endpoint, switch 105 needs to participate in the routing process of VPN 130 based on the TNI. The participation can include sharing of routing information associated with the TNI with the rest of fabric 110, including updating a media access control (MAC) address table.

Egress switch 103, which can be the other tunnel endpoint of the tunnel, can obtain the source role from the tunnel header and decapsulate the tunnel header to obtain the packet. Based on the destination address of the packet, switch 103 can determine the destination role (i.e., role 134 of destination host 122). Switch 103 can traverse policies 152 to determine whether the traffic class of the packet is permitted to be forwarded from role 132 to role 134. If permitted, switch 103 can forward the packet to host 122. Otherwise, switch 103 can refrain from forwarding the packet to host 122 and may drop the packet. Thus, the network described in FIG. 1 depicts how segmentation using GBP requires an associated role for the sender (i.e., a source role) as well as the destination of every packet (i.e., a destination role), which can work successfully when the destination of the packet is known.

However, as described above, when the destination of a packet is unknown (as in BUM traffic), the communications as described above in relation to FIG. 1 may not be sufficient. For example, the destination address of a packet can be a multicast address, which does not indicate an individual destination host. As a result, the packet may not have a corresponding destination role. Consequently, determining whether to forward the packet to a local host based on policies 152 can be challenging for switch 103.

The described aspects can address this challenge by generating a set of synthesized policies 154 (as shown in policy table 150), which are based on user-configured policies 152. User-configured policies 152 can take as input a source role, a destination role, and traffic attributes in order to output an action of allow/drop for a packet. In contrast, synthesized policies 154 can take as input a source role and traffic attributes in order to output a list of allowed destination roles. Synthesized policies 154 can thus yield an equivalent decision model as user-configured policies 152. In other words, a packet which is evaluated using a decision model (i.e., the "second decision model") based on synthesized policies 154 is treated the same as when it is evaluated using a decision model (i.e., the "first decision model") based on user-configured policies 152.

Stage One: Re-Orientation of User-Configured Group-Based Policies to a Transposed Matrix Form Group-based policies can traditionally be associated with destination roles. A single GBP can be associated with every destination role. This single associated GBP can define a set of tuples of source role and traffic attributes which, when matched, can either allow or disallow a packet to be sent to the destination, as described below in relation to FIG. 2A.

FIG. 2A illustrates a table 200 with user-configured group-based policies, in accordance with an aspect of the present application. Table 200 can include rows which indicate: a policy 201; an associated destination role 202; and policy entries 203. Table 200 can include three policies, including a policy for each of the three associated destination roles: a policy P1 for Finance 204; a policy P2 for Admin 205; and a policy P3 for Security 206. Each policy can include one or more policy entries, and each policy can indicate or include: a sequence number (e.g., "10," "20," and "30"); a source role; the destination role; one or more traffic attributes; and an action (e.g., "Allowed" or "Denied"). For example, policy P1 for destination role Finance 204 can include two policy entries. The first policy entry can indicate: a sequence number of "10"; a source role of "Admin"; a destination role of "Finance"; traffic attributes of "IP Protocol TCP" and "L4 Port 10-100"; and an action of "Allowed." A second policy entry can indicate: a sequence number of "20"; a source role of "Any"; a destination role of "Finance"; traffic attributes of "IP Protocol TCP Traffic" and "L4 Port 80"; and an action of "Allowed." Thus, Table 200 depicts how policies may be applied to incoming packets in order to segment traffic based on user roles.

The system can generate a set of synthesized policies from the user-configured policies of table 200 in stages. In a first stage, the system can mathematically model the user-configured policies of FIG. 2A for processing, which can be used by the system in subsequent stages, as described below in relation to FIGS. 2B and 2C. In a second stage, the system can use a matrix output by the first stage (e.g., the transposed matrix of FIG. 2C) and the set of match criterion as input to generate a set of synthesized policies which use only the source role for policy enforcement on incoming traffic (e.g., the "first data structure" of FIG. 2D). In the second stage, the system can also perform detection and handling of overlaps as well as implosion and pruning of match elements, as described below in relation to FIGS. 2D, 2E, and 2F. In a third stage, the system can further process the match elements output by the second stage (e.g., the "second data structure" of FIG. 2F) for optimization through merger and sequencing, as described below in relation to FIG. 2G (e.g., the final "second set of synthesized policies").

The system can represent the user-configured GBPs of FIG. 2A using a mathematical model, which can be used as input for a synthesis process as defined by an algorithm. The system can mark the set of user-configured GPBPs as P, which can be the entire set of policies, represented as:

$$P := \bigcup_{i=1}^{n} P_r \text{ where } r = f(i)$$

where $r \in G$ and represents individual roles which have an associated GBP P, and where $n = |G|$ where G is the complete set of roles participating in GBP-based segmentation. Each individual policy can be an ordered set of a number of policy entries. A policy which is associated with a destination role r can be represented as:

$$P_r := \{E_{r,1}, E_{r,2}, \ldots\}$$

Each policy entry $E_{r,x}$ can contain one match element and one action element. The match element can contain one source role s and a set of match elements to match the traffic attribute(s) $m_i$ of an incoming packet. Each match element $m_i$ can be the most granular traffic attribute against which the incoming packet can be matched. For example, a policy which intends to match against TCP port 80 can be converted into the following set of match elements: {Ethertype==2048, IP_PROTO==6, TCP_PORT==80}. The user can supply the sequence number n which can define the relative priority of the element in the event that a packet matches the match condition of more than one match element. The system can thus represent the policy entry as:

$$E_{r,x}^4 \equiv \begin{pmatrix} s{:}s \in R | * \\ \{\ldots, m_i, \ldots\} {:} m_i \in M \\ a{:}a \in A \\ n{:}n \in N \end{pmatrix}$$

M can be the set of match elements which define the match to be carried out on the user traffic. M can be derived by examining the user-configured policies for the match criterion which are present in the policies and by adding each unique match element into the set of match elements M. Note that N can be the set of natural numbers, and A can be the "Action" set, which can have two elements (e.g., "Allow" and "Deny"). Wildcard entries may be possible for the source role s as well as in match elements. In this stage, wildcard roles may be imploded and a set of policy entries can be derived, where each policy entry can represent a policy for a given destination role and source role. For a wildcard source role, the system can perform implosion by copying the same entry for all possible source roles. The system can handle implosion of wildcard entries at a later stage. Thus, the system can derive a set of destination/source role pair-based policy entries, where each entry is a match/action pair, and can be represented as:

$$_s^d Y_i^3 \equiv \begin{pmatrix} \{\ldots, m_i, \ldots\} {:} m_i \in M \\ a{:}a \in A \\ n{:}n \in N \end{pmatrix}$$

Multiple policy entries may exist for a given destination/source role pair, where each policy entry may have a unique match criteria and action. The system can generate an ordered list of such policy entries to obtain a complete set of policy entries for a given destination/source role pair. This set of destination/source role pair-based policy entries can be represented as:

$$_s^d Y \equiv \bigcup_{i=1}^{m} {}_s^d Y_i^2$$

Given this representation of policy entries, the system can represent the entire set of user-configured policies as an n×n matrix, where each axis can represent the configured roles. Rows in this matrix can represent the destination roles, and columns in this matrix can represent the source roles. Thus, a two-dimensional matrix representation of the entire policy set can be represented as:

$$P \equiv \begin{bmatrix} \cdots & & \\ & {}_{s_j}^{d_i} Y & \\ \vdots & & \ddots & \vdots \\ & \cdots & & \end{bmatrix}$$

The system can thus generate a decision model based on this representation of the user-configured policies. A first decision model based on the user-configured policies can yield the same result for handling a packet as a second decision model based on the synthesized policies (as described below). These two decision models can be considered as "equivalent" if both models result in the same forwarding decision in terms of the "Allow/Deny" action policy for all possible network traffic and packets when applying both models independently on the same traffic and packets. Thus, the system can subject each incoming packet to the first decision model in order to determine the resulting action to take on the packet, which can be either "Allow" or "Deny." This first decision model can be expressed as follows:

$d$ = Role of the destination $s$ = Role of the source $_s^d Y = P[d][s]$

For every policy element $E$ in $_s^d Y$

For the set of match elements $T$ in $E$ match = $\bigwedge_{t \in T} f_t(k)$ where k is the incoming packet on which the first decision model is run, $f_t$ is the match function corresponding to the match condition in match element t, and match is a Boolean which indicates whether k satisfies the match conditions of match element t. Thus, for the first policy element E which results in a 'match'==TRUE, the system can apply the action associated with the specific policy entry on the packet k.

At this point in the first stage, the system can represent the set of user-configured policies P as a two-dimensional matrix which is oriented against the destination roles. That is, the destination roles are the rows and the source roles are the columns. The system can use this two-dimensional matrix (described below in relation to FIG. 2B) to derive the set of policy elements for a pair of destination/source roles to apply the policy on an incoming packet based on the matching traffic attribute.

FIG. 2B illustrates a table 210 which indicates the user-configured GBPs in a matrix, in accordance with an aspect of the present application. Table 210 can include the destination roles as rows (e.g., Finance 214, Admin 215, and Security 216) and the source roles as columns (e.g., Admin 211, Security 212, and Finance 213). Each entry in the matrix of table 210 can indicate one or more traffic attributes and a corresponding action to be taken for a packet with matching traffic attributes. For example, an entry 217 for a destination role of Security 216 and a source role of Admin 211 can indicate the following two policy elements or traffic attributes and actions: "10 IP Protocol UDP, L4 Port Any, Denied"; and "30 IP Protocol Any, L4 Port Any, Allowed."

The system can transpose the matrix P represented by table 210 to obtain a matrix $P^T$, which can be oriented against the source roles, as described below in relation to FIG. 2C. The transposed matrix $P^T$, while oriented against the source roles, still requires the destination roles.

FIG. 2C illustrates a table 220 which indicates the user-configured GBPs in a matrix based on a transposed form associated with FIG. 2B, in accordance with an aspect of the present application. Table 220 can include the source roles as rows (e.g., Admin 224, Security 225, and Finance 226) and the destination roles as columns (e.g., Finance 221, Admin 222, and Security 223). Each entry in the matrix of table 220 corresponds in a transposed format to an entry in table 210. For example, an entry 227 in table 220 for a source role of Admin 224 and a destination role of Security 223 can correspond to an entry 217 of table 210, and can indicate the same two following policy elements or traffic attributes and actions: "10 IP Protocol UDP, L4 Port Any, Denied"; and "30 IP Protocol Any, L4 Port Any, Allowed."

Stage Two: Replacing Action with Destination Role to Obtain Transformed Action

In the second stage, the system can use the transposed matrix $P^T$ to derive an interim set of raw synthesized policies which can use a second decision model that enforces the same policies as in P without having to use the destination role as an input for lookup as in the first decision model. The system can take the transposed matrix $P^T$ and the set of match criterion M as input and derive a set of synthesized policies $S^S$ which uses only the source role to determine policy enforcement on incoming traffic or packets. The system can isolate the policies of each source role from each other, i.e., the policies in one row (which represents policies for one source role) of the transposed matrix $P^T$ do not influence the decision model for another row (which represents policies for another source role).

The system can write the transposed matrix $P^T$ as a union of the set of policies for each source role, where each set is independent of each other set. Although the match criterion in a given source role may match, this does not affect the decision model.

$$P^T \equiv \bigcup_{i=1}^{n} P_s^T$$

where s=f(i), s is the source role, and s∈G. Furthermore, each policy can be considered as a set of policy entries for the source role. A given destination role can be represented as:

$$P_s^T \equiv \bigcup_{j=1}^{n} P_{s,d}^T$$

where=f(j), d is the destination role, and d∈G. As described above, the policy entries for the source/destination role pair $P_{s,d}^T$ can be represented as a set of policy elements, where the policy elements for source role s for the transposed matrix $P^T$ can be written as:

$$_s^d Y_i^3 \equiv \begin{pmatrix} \{\ldots, m_i, \ldots\} : m_i \in M \\ a : a \in A \\ n : n \in N \end{pmatrix}$$

The system can begin converting the policy elements by dropping the destination role as the index, and instead making the destination role a part of the action to carry the intent of the original user-configured policy. The system can replace the action for every element with the destination role if the indicates to allow the packet, and with a null value if the action indicates to deny the packet. Thus, a converted policy element can be represented as:

$$_s^* Y_i^3 \equiv \begin{pmatrix} m & m \in M \\ \{fn(d,a)\} : & a \in A \\ n & n \in N \end{pmatrix}$$

where $fn(x,y) = \begin{cases} x, & \text{if } y == \text{'Allow'} \\ \phi, & \text{if } y == \text{'Deny'} \end{cases}$ Thus, the system can convert the policy from an intent of "Traffic from source role s to destination role d with traffic attribute matching m should have an action a" to an intent of "Traffic from source role s with traffic attribute matching m should be allowed on destination role d if a is 'Allow.'" The resulting data structure can include entries indicating, for a respective source role, a plurality of traffic attributes and, for a respective traffic attribute, a corresponding set of allowed destination roles. The system can use the wildcard character "*" in place of the destination role d as the superscript for the converted policy element to indicate that the same policy element will now match against every or any destination role. An example showing converted policy elements is described below in relation to FIG. 2D.

FIG. 2D illustrates a table 230 which indicates a policy set with transformed actions, in accordance with an aspect of the present application. Table 230 can include fields including: a source role 231; match element(s) 232; and allowed destination role set(s) 233. Table 230 can include entries for the source roles of: Admin 234; Security 235; and Finance 236. As an example, the row or entry for the source role of Admin 234 can include a plurality of traffic attributes and, for a respective traffic attribute, a corresponding set of allowed destination roles, including: a match element 232 of "10 IP Protocol TCP, L4 Port 10-100" and a corresponding allowed destination role set 233 of "{Finance}"; a match element 232 of "20 IP Protocol TCP Traffic, L4 Port 80" and a corresponding allowed destination role set 233 of "{Finance}"; a match element 232 of "20 IP Protocol TCP, L4 Port 10-1000" and a corresponding allowed destination role set 233 of "{Admin}"; a match element 232 of "10 IP Protocol UDP, L4 Port Any" and a corresponding allowed destination role set 233 of "{ }"; and a match element 232 of "30 IP Protocol Any, L4 Port Any" and a corresponding allowed destination role set 233 of "{Security}."

Any role which is not included or listed in allowed destination role set 233 (or an "Allow List") is implicitly denied for the traffic matching a given policy element. Thus, a "Deny List' or a "denied destination role set" is not necessary for the decision model. However, similar to the Allow List, the system can maintain a Deny List for every policy. The Deny List can include the roles which have an explicit "deny" action in the policy entry. The system can use the Deny List to prune or remove disallowed roles while merging policy entries with conflicting intent, as described below.

Various translated policy elements $_s^*\Psi_i^3$ corresponding to the same source role s may contain an overlap in their match condition. The overlap can be due to a wildcard being used in the match condition or due to the use of a range in a field of the match element. The system can match multiple overlapping entries against the traffic with a matching pattern and can remove the overlap to ensure that the policies and decision model result in a deterministic decision.

Stage Two: Detecting and Handling Overlaps; Implosion and Pruning

The system can detect overlaps and merge common match conditions to yield a new set of crossover policy elements (raw synthesized policies). This set of raw synthesized policies can correspond to a second "equivalent" decision model of the first decision model (which is based on the user-configured policies of FIG. 2A). The system can detect overlaps by first converting all values, ranges, and wildcards into a possible set of natural numbers in every match element. A converted value can result in a set of a single element containing that value only. The system can convert wildcards and ranges into sets of elements with all possible values for the wildcard field or for the range.

For example, if a wildcard "Any" is used to match in the IP_PROTO field of an incoming packet, the system can represent that wildcard entry as $\{0, \ldots, 2^8-1\}$. Similarly, the system can represent a wildcard of "Any" in the Ethertype field as $\{0, \ldots, 2^{16}-1\}$. The system can use a similar approach for other traffic attributes, such as the TCP/UDP port numbers, etc. The system can first expand all the match conditions using this approach to detect overlaps. The system can record or mark the level of the expansion by adding an attribute to the list with: a value of '0' for an exact value derived list; a value of '1' for a list being derived out of a range; and a value of '2' for a wildcard derived list.

FIG. 2E illustrates a table 240 corresponding to FIG. 2D, including wildcard expansion and overlap detection of entries, in accordance with an aspect of the present application. Table 240 can include fields including: a source role 241; match element(s) 242; and allowed destination role set(s) 243. Table 240 can include entries for the source roles of: Admin 244 (corresponding to Admin 234); Security 245 (corresponding to Security 235); and Finance 246 (corresponding to Finance 236). In table 240, no wildcard entries exist, as the system has replaced all wildcard entries with an appropriate range for the given attribute (e.g., replacing wildcard elements 237 and 238 with, respectively, elements 247 and 248). Overlapping match element entries are highlighted in bold, e.g., for Admin 244: "20 IP Protocol TCP Traffic, L4 Port 80-80"; "10 IP Protocol UDP, L4 Port 1-65535"; and "30 IP Protocol 1-255, L4 Port 1-65535." Only the policy entries which belong to the same source role can be candidates for new crossover policy elements, because entries which belong to different source roles do not influence the decision model for a packet (as the packet can only belong to a single source role).

In table 240, the system can also add the source role to the allowed destination role set 243 to allow for traffic between clients belonging to the same role ("intra-role traffic"), unless an explicit deny policy exists for intra-role traffic. For example, for the source role of Security 245, the traffic with TCP Port 90 is denied and thus does not contain the role "Security."

In detecting overlaps, the system can check only the same type of attributes, e.g., a match element with Ethertype in one match condition will only be checked for overlap against a match element with Ethertype in another match condition. Overlaps can occur between some or all match elements, or between two match conditions. Two types of overlaps are possible in the match conditions: a complete overlap, wherein a first match condition is completely subsumed in a second match condition; and a partial overlap, wherein only a portion of the match set is common. Two match conditions C and D can be defined to have a complete overlap if and only if $C \subset D$ and C!=D. Two match conditions C and D can be defined to have a partial overlap if and only if $C \cap D != \emptyset$ and $C \backslash D != \emptyset$ and $D \backslash C != \emptyset$.

Specifically, a pair of match conditions with completely overlapping match sets A and B can be broken into three match sets X, Y, Z, such that $X=\{x:x<y \forall y \in Y, x \in D\}$ and $Y=C$ and $Z=\{z:z>y \forall y \in Y, x \in D\}$. The match set D is then replaced with the three match sets X, Y, Z because $D \equiv X \cup Y \cup Z$. No change is made to C because C is the common set in the overlap, and both the match elements will have C in common.

A pair of match conditions with partially overlapping match sets A and B can be broken into three match sets X, Y, Z, such that $X=\{x:x<y \forall y \in Y, x \in C\}$ and $Y=C \cap D$ and $Z=\{z:z>y \forall y \in Y, z \in D\}$. The match set C is replaced with two sets X and Y because $C \equiv X \cup Y$ and D is replaced with two sets Y and Z since $D \equiv Y \cup Z$.

Every element split in this manner due to overlap can be replaced with more than one match element. It may be possible that multiple match elements belonging to the same match condition may be split. The system can begin crossover of the overlapping policy elements by creating a new crossover policy element using the match set Y. For both types of overlaps (complete and partial), Y is the common match set, and thus Y can contribute in generating the crossover policy element. The match element is defined by the set Y, and the lowest sequence number from the two match elements can be used as the sequence number of the crossover match element. A similar approach can be used for the level of expansion to be associated with the new crossover policy element. The system can derive the action of the new crossover policy element using a union of the roles in the allowed destination role sets of both the policy entries C and D. However, the system will remove any entry which is in the explicit Deny List of the policy entry with the lesser level of expansion (i.e., having a more specific match) from the new set of allowed destination roles.

Thus, the system can remove the set Y from both the overlapping policy elements, because the intent for the match set Y from both policies can be covered by the new crossover policy element. This can result in removing the overlap between the pair of policy elements by carving out a new crossover policy element using this crossover method.

Some of the match sets in a single match element may be replaced with more than one match set. This may require an implosion of the match elements, because each match element must have a single match set for one traffic attribute. New policy elements can be created by taking all combinations of these match sets to create match elements with single match sets for each traffic attribute present in the match condition. This corresponds to an implosion of the match elements within the same match condition of a single policy element, as depicted below in relation to FIG. 2F. The system can create these imploded policy elements by using each match element from the parent policy element. These imploded policy elements can carry or store other parameters, such as the sequence number, the level of expansion, and the action from the original match element.

However, not all combinations of these imploded match elements may be valid against the originally configured match condition, even though the individual match sets contributing to the match element were individually valid. Thus, the system must check all these imploded policy elements for validity against the original policy elements to determine whether the combination of the match elements in its match set is valid or not. All policy elements which do not result in successful validation against the original policy can be pruned from the list of newly created policy elements, such that only the valid policy elements remain in the imploded list. This imploded list (with the invalid policy elements pruned or removed) can be used to replace the parent policy element, as depicted below in relation to FIGS. 2F and 2G.

The system can perform this same process for both the elements of the pair which were part of the overlap processing. After processing both elements of the pair, the system can eliminate all overlap between the pair by creating a number of new imploded policy elements and one crossover policy element. The system can perform this same process on the entire set of policy elements until all pairs in the set have been checked and handled for possible overlap in their match condition. After the system has completed this process of crossover, implosion, and pruning, the system can determine a number of non-overlapping policy elements with the action represented in terms of a set of allowed destination roles for the matching packets. These non-overlapping policy elements can result in an equivalent decision output ("second decision model") as the original user-configured policy set ("first decision model").

The system can take a more optimized approach towards crossover for wildcard entries. Because wildcard entries will match as an overlap for all policy entries, the system does not split the wildcard entries using the above-described method. Instead, wildcard entries can be considered as an overlap, and a union of the wildcard destination roles can always be included in the more specific entry unless the more specific entry results in a conflict (i.e., includes a "deny" policy for a destination role present in the allowed destination role set of the wildcard).

FIG. 2F illustrates a table 250 corresponding to FIG. 2E, including implosion and pruning of entries for the source role of "Admin," in accordance with an aspect of the present application. Table 250 can include fields including: a source role 251; match element(s) 252; and allowed destination role set(s) 253. Table 250 can include match element(s) 252 for a source role Admin 254 (corresponding to Admin 244). Table 250 can include all the imploded entries for the source role Admin 254, with the policy entries in a dashed-line box 255 indicated as needing to be pruned due to failing validation against the original user-configured policies, and the policy entries listed in bold text being retained due to successful validation against the original user-configured policies.

This second stage of processing can end with the derivation of these non-overlapping and valid set of policy elements, as a set of first synthesized policies. The system can now use this set of first synthesized policies to enforce the user-configured GBPs, even for unknown flows, because the set of first synthesized policies can provide a list of allowed destination roles for in the action for the policy element.

Stage Three: Optimization Through Merging and Sequencing

In the third stage of processing, the system can perform several operations, including: optimizing the synthesized first set of policies; ensuring proper sequencing for elements that may have the same sequence number but define a conflicting decision; and converting the raw synthesized policy elements into an appropriate policy syntax The system can begin the third stage of processing by examining all the policy elements belonging to one source role for possible merger. The system can merge two policy elements if the match elements of the two policy elements contain match sets which are either identical or contiguous to each other. If a merger is determined, the system can merge the two policy elements to form a new range in a new policy element. The action of the new policy element can be defined by a union of the two allowed destination role sets from both the policy elements. The policy entries in a dashed-line box 256 of table 250 are an example of candidate entries for a merger, as their match sets are contiguous to each other. The system can create a single policy entry out of the merger of these candidate entries in box 256, as depicted below in relation to FIG. 2G.

Because a fusion of policy elements belonging to different destination roles may occur while deriving the set of synthesized policies, the user-configured sequence number may not have a significant impact. This is because the user-configured sequence number had previously specified the relative priority with a class of entries associated to one destination role. Because the system can remove all the overlap between policy elements (as described above), a packet can now match against only a single policy element, and thus the sequence number may no longer be relevant for the second decision model.

However, one exception to this sequence number significance is wildcard entries. The overlaps with wildcard entries are not removed for the purpose of achieving a more optimized implosion of entries. The system can use the level of expansion to determine the relative ordering, with the less specific wildcard entries coming higher in sequence number (i.e., lower in match priority) than the more specific entries. This can ensure that a wildcard entry does not incorrectly override traffic regulated by a more specific policy. The elements with a lower level of expansion can represent a more specific entry, so the system can assign those elements a lower sequence number in the synthesized policy set. The system can refer to this synthesized policy set as P'. Similarly, the system can denote the collection of the derived match elements that comprise the match conditions of these policy elements as M'.

FIG. 2G illustrates a table of synthesized policies based on the user-configured policies of FIG. 2A and the result of the processing depicted in FIGS. 2B-2F, in accordance with an aspect of the present application.

The system can translate the set of optimized policy entries (as in table 260) into a user-readable policy syntax. The system can first perform a reverse transformation of the match sets in every policy element. Every match set that represents the complete match space can be replaced with the string "any." Every match set with a single element can be translated into a single value instead of a set. Every list which represents a contiguous set of values can be converted into a range with a notation of "a:b." After the system performs this conversion of the match sets, the translation of the synthesized policy element into policy entries using an actual policy syntax can be performed as described below.

A policy element can be represented as:

$$_s^* Y_i^3 \equiv \begin{pmatrix} m:m \in M' \\ L:L \equiv \{r:r \in G\} \\ n:n \in N \end{pmatrix}$$

where L is a set of destination roles which represent the derived action for the synthesized policy element. The system can represent this policy element using a policy syntax such as: "Policy sequence number n for source role s with match condition m allows traffic to a destination role set L."

The decision model for this set of optimized synthesized policies ("second decision model") can first identify the source role s for an incoming packet k. The system can then retrieve the set of policy entries associated with the source role s. The second decision model can be expressed as follows:

$s$ = Role of the source $_s^* Y = P'[s]$

For every policy element $E$ in $_s^* Y$

For the set of match elements $T$ in $E$ match = $\bigwedge_{t \in T} f_t(k)$

For the first policy element E' which results in a 'match'==TRUE, the system can apply the action associated with the specific policy entry on the packet k. The action in the synthesized policy element is not a member of the action set A, and instead is an Allow List represented by a set of allowed destination roles to which the traffic will be allowed. The system can represent each destination role set as a "Role Policy Aware Distribution List" (or RPADL), which can include a list of ports. The system can include a given port in the RPADL for a destination role set if at least one client connected over the given port belongs to one of the roles in the destination role set. This can indicate that a packet matching a policy element E' (as described above) can be allowed to be forwarded on a port only if the port belongs to the RPADL corresponding to the action of the policy element.

Once the system has derived the RPADL for an incoming packet, the system can allow the packet to pass through the forwarding pipelines making forwarding decisions independent of the GBPs. Once the system has made the forwarding decisions and performed possible replications of the incoming packets based on the forwarding lookups, the system can pass each replicated packet to the egress pipeline for egress processing. At this stage, each replicated packet can carry the RPADL information in the packet metadata. Before the system makes a final decision about whether to forward the packet on particular port, the system can apply the RPADL on the packet to determine whether the port is allowed as an egress packet for the incoming packet, i.e., in conformance with any configured GBP.

The described aspects provide a solution which creates an allowed distribution list or destination role set (e.g., via the set of synthesized policies, as in FIG. 2G) for a flow, and can mask out forbidden ports from the distribution of an incoming packet. The described aspects allow traffic on a port if a client exists with the allowed roles for a flow, so the system cannot further filter the traffic if multiple clients exist on a single port belonging to different roles. Because the system performs the role-based policy enforcement at the edge of the fabric, the issue of multiple clients on a single port belonging to different roles may not be a practical limitation of the described aspects, as multiple clients may not be expected on a single port.

Thus, the described aspects of the system can provide equivalence of the second decision model with the first decision model. That is, a packet which would have been dropped by the direct application of a destination role-based policy for a given source role and traffic attributes (as in the first decision model) can now become masked out from ports which contain clients belonging to that role only (as in the second decision model).

Method for Facilitating Policy Synthesis to Enforce GBPs to Unknown Flow

Figure 3:
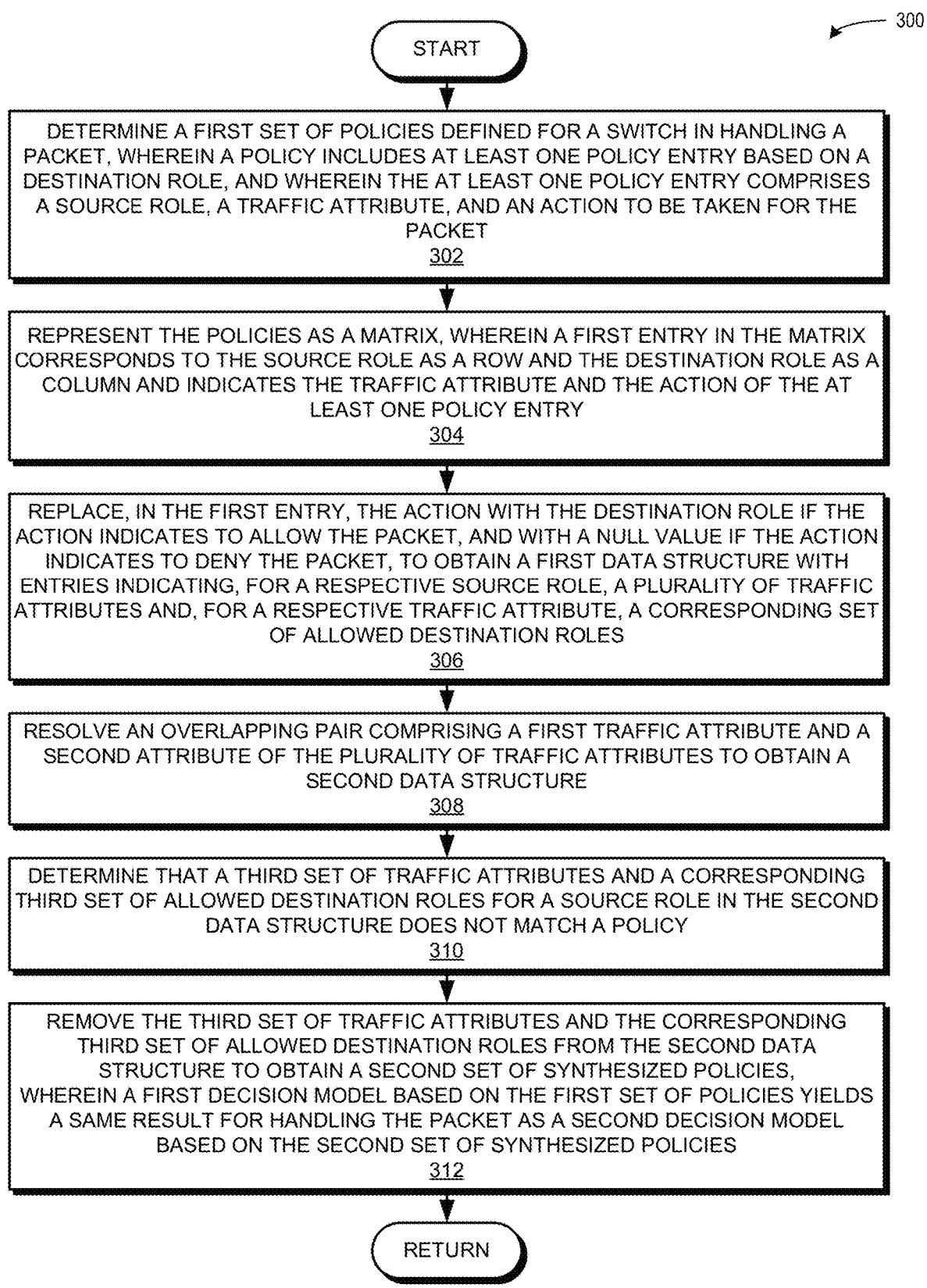
FIG. 3 presents a flowchart illustrating a method which facilitates policy synthesis to enforce GBPs to unknown flows, in accordance with an aspect of the present application.

FIG. 3 presents a flowchart 300 illustrating a method which facilitates policy synthesis to enforce GBPs to unknown flows, in accordance with an aspect of the present application. During operation, the system determines a first set of policies defined for a switch in handling a packet, wherein a policy includes at least one policy entry based on a destination role, and wherein the at least one policy entry comprises a source role, a traffic attribute, and an action to be taken for the packet (operation 302) (as described above in relation to FIG. 2A). A policy in the first set of policies can be a user-configured policy or a group-based policy (GBP). The system represents the policies as a matrix, wherein a first entry in the matrix corresponds to the source role as a row and the destination role as a column and indicates the traffic attribute and the action of the at least one policy entry (operation 304) (as described above in relation to FIGS. 2B and 2C). The system replaces, in the first entry, the action with the destination role if the action indicates to allow the packet, and with a null value if the action indicates to deny the packet, to obtain a first data structure with entries indicating, for a respective source role, a plurality of traffic attributes and, for a respective traffic attribute, a corresponding set of allowed destination roles (operation 306) (as described above in relation to FIG. 2D).

The system resolves an overlapping pair comprising a first traffic attribute and a second traffic attribute of the plurality of traffic attributes in the first data structure to obtain a second data structure (operation 308) (as described above in relation to FIGS. 2E and 2F). The system determines that a third set of traffic attributes and a corresponding set of allowed destination roles for a source role in the second data structure does not match a policy (e.g., a user-configured policy or a GBP) (operation 310), and removes the third set of traffic attributes and the corresponding set of allowed destination roles from the second data structure to obtain a second set of synthesized policies, wherein a first decision model based on the first set of policies yields a same result for handling the packet as a second decision model based on the second set of synthesized policies (operation 312) (as described above in relation to FIGS. 2F and 2G).

Figure 4A:
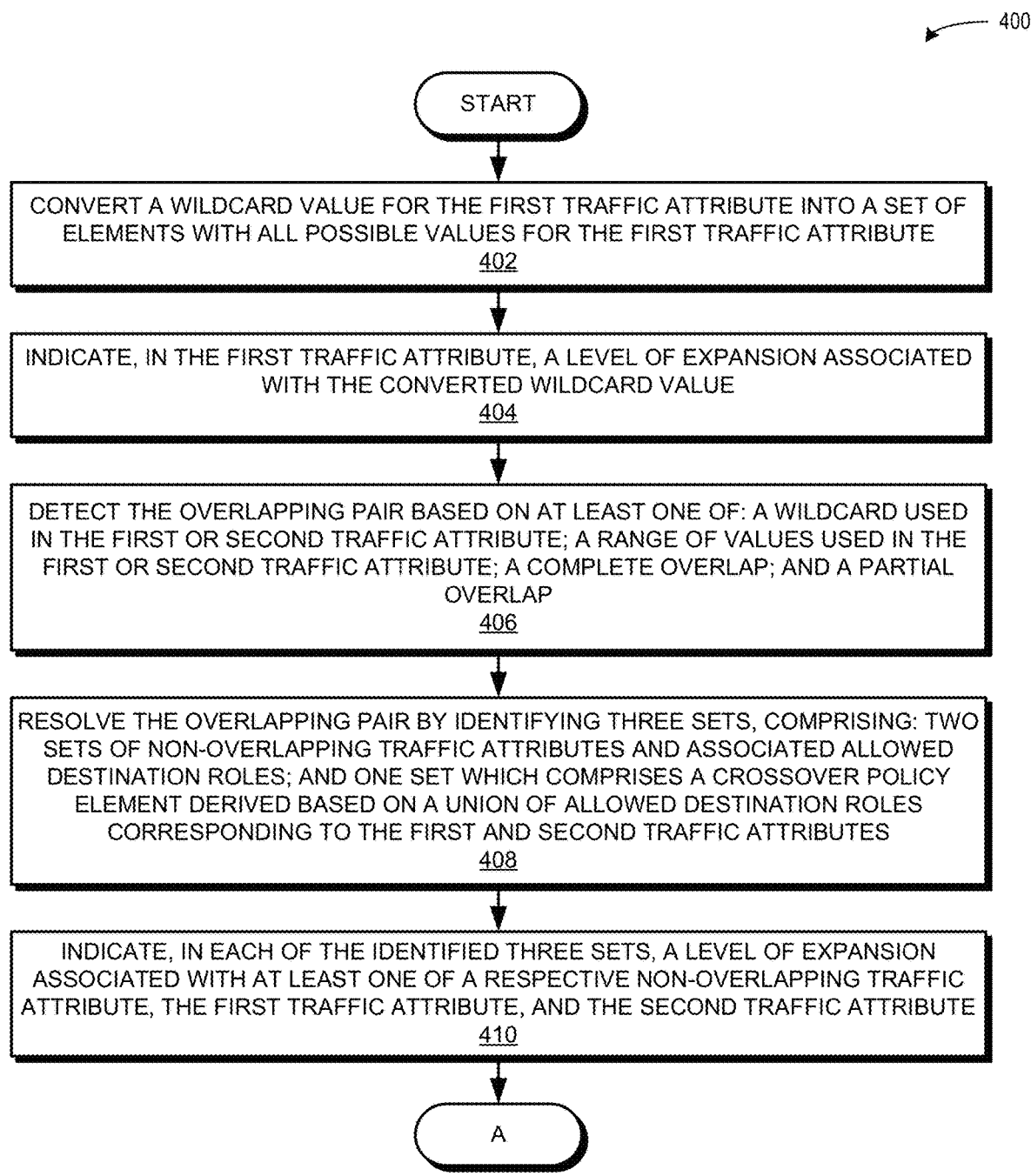
FIG. 4A presents a flowchart illustrating a method which facilitates policy synthesis to enforce GBPs to unknown flows, including implosion, overlap detection and handling, pruning, and merging, in accordance with an aspect of the present application.

FIG. 4A presents a flowchart 400 illustrating a method which facilitates policy synthesis to enforce GBPs to unknown flows, including implosion, overlap detection and handling, pruning, and merging, in accordance with an aspect of the present application. The operations in flowchart 400 provide additional detail for the operations in flowchart 300. The system converts a wildcard value for the first traffic attribute into a set of elements with all possible values for the first traffic attribute (operation 422). The system indicates, in the first traffic attribute, a level of expansion associated with the converted wildcard value (operation 424). The system detects the overlapping pair based on at least one of: a wildcard used in the first or second traffic attribute; a range of values used in the first or second traffic attribute; a complete overlap; and a partial overlap (operation 406). The system resolves the overlapping pair by identifying three sets comprising: two sets of non-overlapping traffic attributes and associated allowed destination roles; and one set which comprises a crossover policy element derived based on a union of allowed destination roles corresponding to the first and second traffic attributes (operation 408). The system indicates, in each of the identified three sets, a level of expansion associated with at least one of a respective non-overlapping traffic attribute, the first traffic attribute, and the second traffic attribute (operation 410), and the operation continues at Label A of FIG. 4B.

Figure 4B:
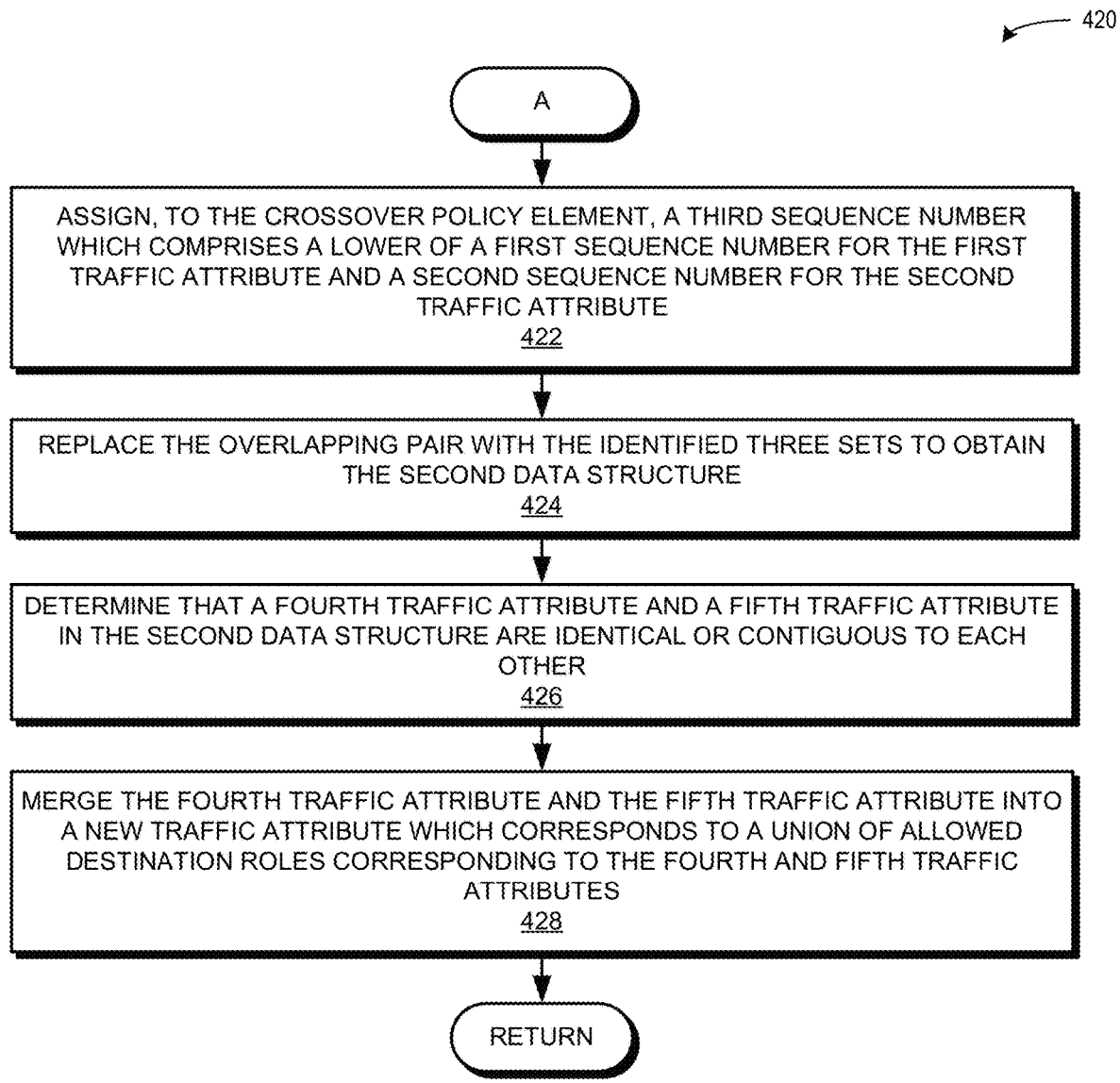
FIG. 4B presents a flowchart illustrating a method which facilitates policy synthesis to enforce GBPs to unknown flows, including implosion, overlap detection and handling, pruning, and merging, in accordance with an aspect of the present application.

FIG. 4B presents a flowchart 420 illustrating a method which facilitates policy synthesis to enforce GBPs to unknown flows, including implosion, overlap detection and handling, pruning, and merging, in accordance with an aspect of the present application. The system assigns, to the crossover policy element, a third sequence number which comprises a lower of a first sequence number for the first traffic attribute and a second sequence number for the second traffic attribute (operation 422). The system replaces the overlapping pair with the identified three sets to obtain the second data structure (operation 424). The system determines that a fourth traffic attribute and a fifth traffic attribute in the second data structure are identical or contiguous to each other (operation 426). The system merges the fourth traffic attribute and the fifth traffic attribute into a new traffic attribute which corresponds to a union of allowed destination roles corresponding to the fourth and fifth traffic attributes (operation 428), and the operation returns.

Computer System and Apparatus

Figure 5:
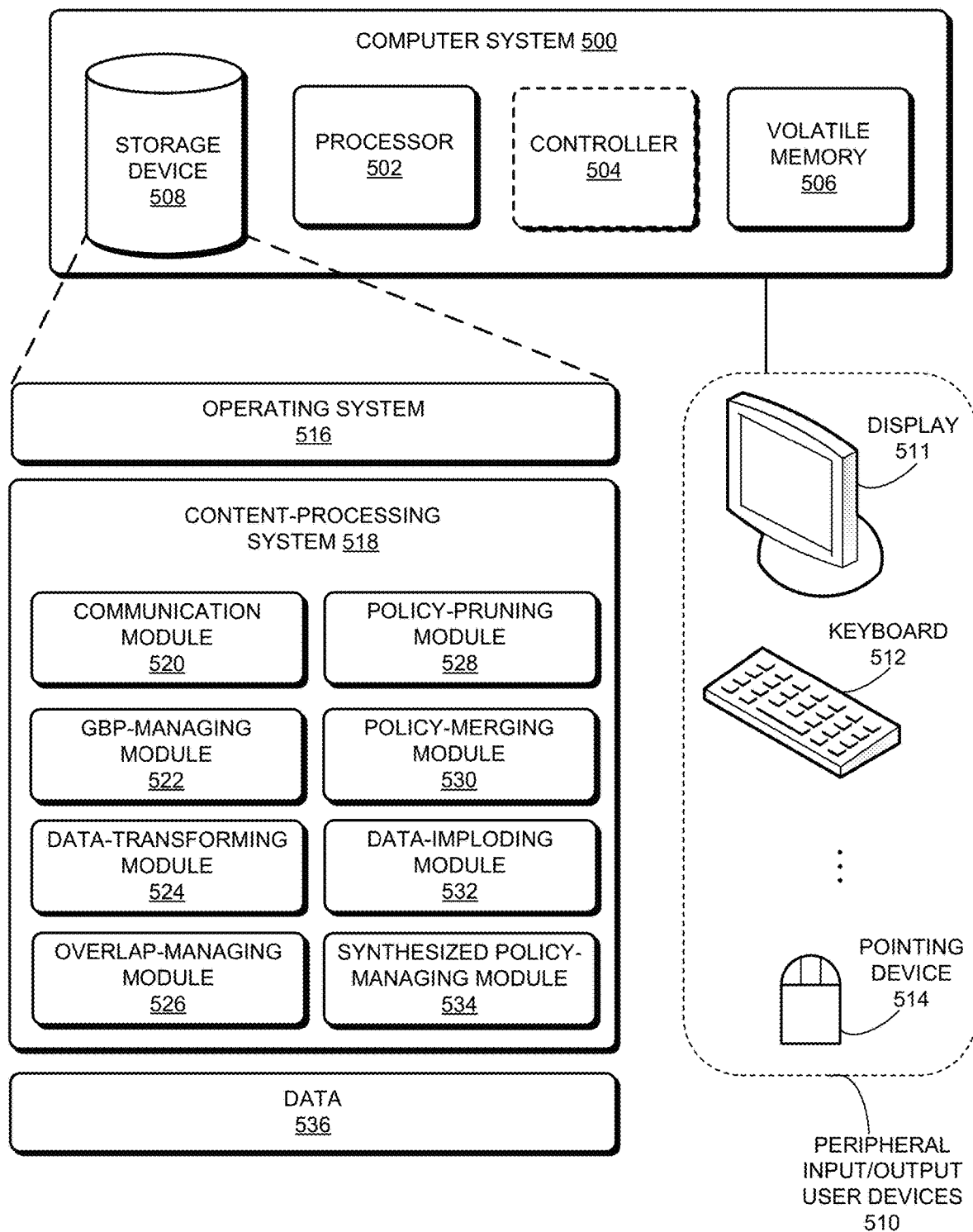
FIG. 5 illustrates a computer system which facilitates policy synthesis to enforce GBPs to unknown flows, in accordance with an aspect of the present application.

FIG. 5 illustrates a computer system which facilitates policy synthesis to enforce GBPs to unknown flows, in accordance with an aspect of the present application. Computer system 500 includes a processor 502, a volatile memory 506, and a storage device 508. In some aspects, computer system 500 can include a controller 504 (indicated by the dashed lines). Volatile memory 506 can include, e.g., random access memory (RAM), that serves as a managed memory, and can be used to store one or more memory pools. Storage device 508 can include persistent storage which can be managed or accessed via processor 502 (or controller 504). Furthermore, computer system 500 can be coupled to peripheral input/output (I/O) user devices 510, e.g., a display device 511, a keyboard 512, and a pointing device 514. Storage device 508 can store an operating system 516, a content-processing system 518, and data 536.

Content-processing system 518 can include instructions, which when executed by computer system 500, can cause computer system 500 or processor 502 to perform methods and/or processes described in this disclosure. Specifically, content-processing system 518 can include instructions for receiving and transmitting data packets, requests, and responses (communication module 520).

Content-processing system 518 can further include instructions for determining a first set of policies defined for a switch in handling a packet, wherein a policy includes at least one policy entry based on a destination role, and wherein the at least one policy entry comprises a source role, a traffic attribute, and an action to be taken for the packet (GBP-managing module 522). Content-processing system 518 can include instructions for representing the policies as a matrix, wherein a first entry in the matrix corresponds to the source role as a row and the destination role as a column and indicates the traffic attribute and the action of the at least one policy entry (data-transforming module 524). Content-processing system 518 can include instructions for replacing, in the first entry, the action with the destination role if the action indicates to allow the packet, and with a null value if the action indicates to deny the packet, to obtain a first data structure with entries indicating, for a respective source role, a plurality of traffic attributes and, for a respective traffic attribute, a corresponding set of allowed destination roles (data-transforming module 524). Content-processing system 518 can also include instructions for resolving an overlapping pair comprising a first traffic attribute and a second traffic attribute to obtain a second data structure (overlap-managing module 526). Content-processing system 518 can include instructions for determining that a third traffic attribute for a source role in the second data structure does not match a policy and removing the third traffic attribute from the second data structure to obtain a second set of synthesized policies (policy-pruning module 528 and synthesized policy-managing module 534).

Content-processing system 518 can additionally include instructions for detecting and handling overlaps (overlap-managing module 526), imploding policy elements (data-imploding module 532), pruning policy elements (policy-pruning module 528), and merging policies (policy-merging module 530), including the operations described above in relation to FIGS. 4A and 4B. Content-processing system 518 can include instructions for creating the second decision model based on the second set of synthesized policies, wherein a first decision model based on the first set of policies yields a same result for handling a packet as a second decision model based on the second set of synthesized policies (synthesized policy-managing module 534).

Data 536 can include any data that is required as input or generated as output by the methods and/or processes described in this disclosure. Specifically, data 536 can store at least: data; a request; a response; a policy; a user-configured policy; a group-based policy; a set of policies; a policy entry; a source role; a destination role; a traffic attribute; a match element; a match condition; an action; a matrix; a transposed matrix; an entry; a replaced action; a null value; a set of allowed destination roles; an overlapping pair; a resolved overlapping pair; a first data structure; a second data structure; a transformed data structure; a synthesized policy; a set of synthesized policies; a wildcard; a wildcard value; a level of expansion; a set of non-overlapping traffic attributes; a crossover policy element; a union of allowed destination roles; a sequence number; a user-configured sequence number; a match priority; a range of values; a complete overlap; a partial overlap; a set of disallowed destination roles; an Allow List; a Deny List; a network protocol; a port number; configuration information for a switch; a characteristic of network traffic; a first decision model; a second decision model; an input; and an output.

Figure 6:
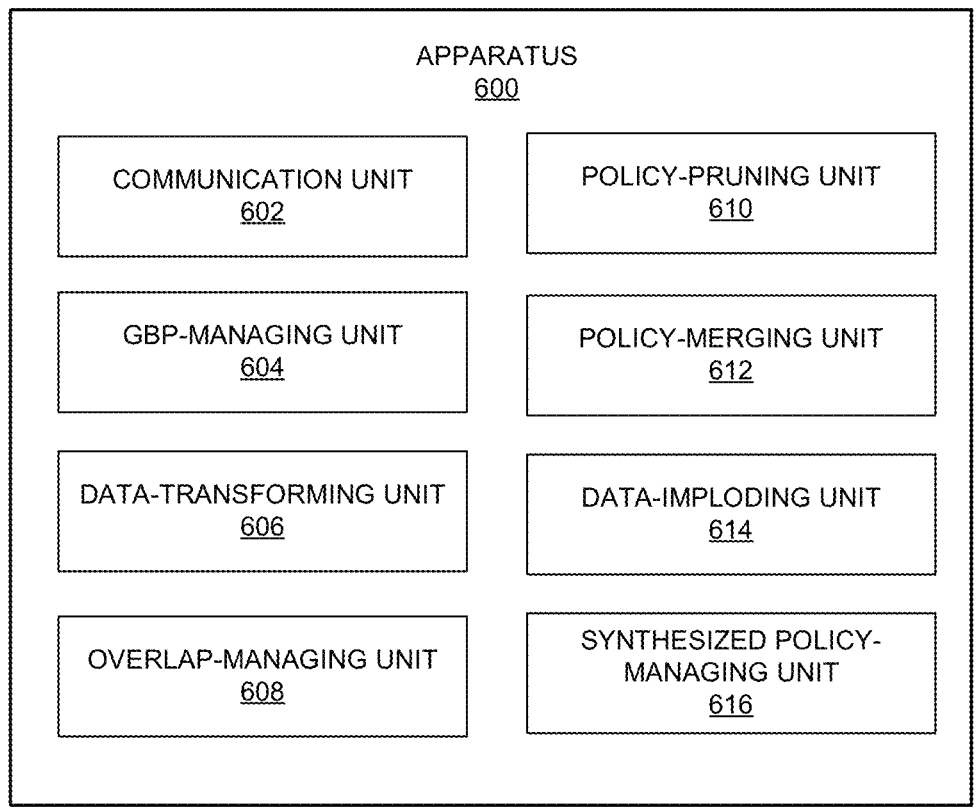
FIG. 6 illustrates an apparatus which facilitates policy synthesis to enforce GBPs to unknown flows, in accordance with an aspect of the present application.

FIG. 6 illustrates an apparatus 600 which facilitates policy synthesis to enforce GBPs to unknown flows, in accordance with an aspect of the present application. Apparatus 600 can comprise a plurality of units or apparatuses which may communicate with one another via a wired, wireless, quantum light, or electrical communication channel. Apparatus 600 may be realized using one or more integrated circuits, and may include fewer or more units or apparatuses than those shown in FIG. 6. Furthermore, apparatus 600 may be integrated in a computer system, or realized as a separate device or devices capable of communicating with other computer systems and/or devices.

Apparatus 600 may also include a non-volatile storage system or a memory management unit. Apparatus 600 can comprise modules or units 602-616 which are configured to perform functions or operations similar to modules 520-534 of computer system 500 of FIG. 5, including: a communication unit 602; a GBP-managing unit 604; a data-transforming unit 606; an overlap-managing unit 608; a policy-pruning unit 610; a policy-merging unit 612; a data-imploding unit 614; and a synthesized policy-managing unit 616.

In general, the disclosed aspects provide a system which facilitates policy synthesis to enforce GBPs to unknown flows. In one aspect of the present application, the system determines a first set of policies defined for a switch in handling a packet, wherein a policy includes at least one policy entry based on a destination role, wherein the at least one policy entry comprises a source role, a traffic attribute, and an action to be taken for the packet. The system represents the policies as a matrix, wherein a first entry in the matrix corresponds to the source role as a row and the destination role as a column and indicates the traffic attribute and the action of the at least one policy entry. The system replaces, in the first entry, the action with the destination role if the action indicates to allow the packet, and with a null value if the action indicates to deny the packet, to obtain a first data structure with entries indicating, for a respective source role, a plurality of traffic attributes and, for a respective traffic attribute, a corresponding set of allowed destination roles. The system resolves an overlapping pair comprising a first traffic attribute and a second traffic attribute to obtain a second data structure. The system determines that a third traffic attribute for a source role in the second data structure does not match a policy. The system removes the third traffic attribute from the second data structure to obtain a second set of synthesized policies, wherein a first decision model based on the first set of policies yields a same result as a second decision model based on the second set of synthesized policies.

In a variation on this aspect, prior to resolving the overlapping pair in the first data structure, the system performs the following operations. The system converts a wildcard value for the first traffic attribute into a set of elements with all possible values for the first traffic attribute, and indicates, in the first traffic attribute, a level of expansion associated with the converted wildcard value. The level of expansion is based on at least one of: a list derived based on an exact value; a list derived based on a range of values; and a list derived based on a wildcard value.

In a further variation, the system resolves the overlapping pair in the first data structure by: identifying three sets comprising: two sets of non-overlapping traffic attributes and associated allowed destination roles; and one set which comprises a crossover policy element derived based on a union of a first set of allowed destination roles corresponding to the first traffic attribute and a second set of allowed destination roles corresponding to the second traffic attribute. The system indicates, in each of the identified three sets, a level of expansion associated with at least one of a respective non-overlapping traffic attribute, the first traffic attribute, and the second traffic attribute. The system replaces the overlapping pair with the identified three sets to obtain the second data structure.

In a further variation, a respective traffic attribute is associated with a user-configured sequence number. The system assigns, to the crossover policy element, a third sequence number which comprises a lower of a first user-configured sequence number associated with the first traffic attribute and a second user-configured sequence number associated with the second traffic attribute.

In a further variation, the system assigns, to a respective policy element or traffic attribute in the second set of synthesized policies, a sequence number to the respective policy element or traffic attribute based on the indicated level of expansion. A first policy element with a lower level of expansion and a lower sequence number indicates a more specific policy than a second policy element with a higher level of expansion and a higher sequence number, and the higher sequence number indicates a lower match priority in the second set of synthesized policies for the source role.

In a further variation, the system detects the overlapping pair based on at least one of: a wildcard used in the first or second traffic attribute; a range of values used in the first or second traffic attribute; a complete overlap, wherein the first traffic attribute is subsumed in the second traffic attribute; and a partial overlap, wherein a portion of the first traffic attribute matches a portion of the second traffic attribute.

In a further variation, subsequent to removing the third traffic attribute from the second data structure, the system removes a corresponding third set of allowed destination roles from the second data structure. Responsive to determining that a fourth traffic attribute and a fifth traffic attribute in the second data structure are identical or contiguous to each other, the system merges the fourth traffic attribute and the fifth traffic attribute into a new traffic attribute which corresponds to a union of a fourth set of allowed destination roles corresponding to the fourth traffic attribute and a fifth set of allowed destination roles corresponding to the fifth traffic attribute.

In a further variation, the entries in the first data structure further indicate, for the respective source role and the respective traffic attribute, a corresponding set of disallowed destination roles. The system determines that the third traffic attribute does not match the policy based on the corresponding set of disallowed destination roles.

In a further variation, a traffic attribute comprises a plurality of attributes associated with at least one of: a network protocol; a port number; information associated with a configuration of the switch; and a characteristic of network traffic.

In a further variation, the first decision model takes as input, for an incoming packet, a source role, a destination role, and traffic attributes, and returns as output an action for the incoming packet. The second decision model takes as input, for the incoming packet, a policy sequence number, the source role, and the traffic attributes, and returns as output a set of allowed destination roles.

In a further variation, the policies in the first set of policies comprise at least one of: a user-configured policy; and a group-based policy.

In a further variation, prior to representing the policies as the matrix, the method further comprises, the system performs the following operations. The system represents the first set of user-configured policies as an initial matrix, wherein a first entry in the initial matrix corresponds to the source role as a row and the destination role as a column and indicates the traffic attribute and the action of the at least one policy entry. The system transposes the initial matrix to obtain the matrix, wherein the first entry in the initial matrix indicates same information as the first entry in the matrix.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware devices or apparatus. For example, the hardware devices or apparatus can include, but are not limited to, application-specific integrated circuit (ASIC) chips, field-programmable gate arrays (FPGAs), dedicated or shared processors that execute a particular software program or a piece of code at a particular time, and other programmable-logic devices now known or later developed. When the hardware devices or apparatus are activated, the hardware modules perform the methods and processes included within them.

The foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A computer-executable method, comprising:
    determining a first set of policies defined for a switch in handling a packet, wherein a policy includes at least one policy entry based on a destination role, and wherein the at least one policy entry comprises a source role, a traffic attribute, and an action to be taken for the packet;
    receiving an incoming packet at the switch, wherein a destination of the incoming packet is unknown;
    representing the first set of policies as a matrix, wherein a first entry in the matrix corresponds to the source role as a row and the destination role as a column and indicates the traffic attribute and the action of the at least one policy entry;
    replacing, in the first entry, the action with the destination role if the action indicates to allow the packet, and with a null value if the action indicates to deny the packet, to obtain a first data structure with entries indicating, for a respective source role, a plurality of traffic attributes and, for a respective traffic attribute, a corresponding set of allowed destination roles;
    resolving an overlapping pair comprising a first traffic attribute and a second traffic attribute to obtain a second data structure;
    determining that a third traffic attribute for a source role in the second data structure does not match a policy;
    removing the third traffic attribute from the second data structure to obtain a second set of synthesized policies, wherein a first decision model based on the first set of policies yields a same result as a second decision model based on the second set of synthesized policies;
    allowing or denying the incoming packet at the switch to be forwarded using the second decision model;
    in response to allowing, forwarding the incoming packet to a local host; and
    in response to denying, dropping the incoming packet.

2. The computer-executable method of claim 1, wherein prior to resolving the overlapping pair in the first data structure, the method further comprises:
    converting a wildcard value for the first traffic attribute into a set of elements with all possible values for the first traffic attribute; and
    indicating, in the first traffic attribute, a level of expansion associated with the converted wildcard value,
    wherein the level of expansion is based on at least one of:
        a list derived based on an exact value;
        a list derived based on a range of values; and
        a list derived based on a wildcard value.

3. The computer-executable method of claim 2, wherein resolving the overlapping pair in the first data structure comprises:
    identifying three sets comprising:
        two sets of non-overlapping traffic attributes and associated allowed destination roles; and
        one set which comprises a crossover policy element derived based on a union of a first set of allowed destination roles corresponding to the first traffic attribute and a second set of allowed destination roles corresponding to the second traffic attribute;
    indicating, in each of the identified three sets, a level of expansion associated with at least one of a respective non-overlapping traffic attribute, the first traffic attribute, and the second traffic attribute; and
    replacing the overlapping pair with the identified three sets to obtain the second data structure.

4. The computer-executable method of claim 3, wherein a respective traffic attribute is associated with a user-configured sequence number, and wherein the method further comprises:
    assigning, to the crossover policy element, a third sequence number which comprises a lower of a first user-configured sequence number associated with the first traffic attribute and a second user-configured sequence number associated with the second traffic attribute.

5. The computer-executable method of claim 4, further comprising:
    assigning, to a respective policy element or traffic attribute in the second set of synthesized policies, a sequence number to the respective policy element or traffic attribute based on the indicated level of expansion,
    wherein a first policy element with a lower level of expansion and a lower sequence number indicates a more specific policy than a second policy element with a higher level of expansion and a higher sequence number, and
    wherein the higher sequence number indicates a lower match priority in the second set of synthesized policies for the source role.

6. The computer-executable method of claim 1, further comprising:
    detecting the overlapping pair based on at least one of:
        a wildcard used in the first or second traffic attribute;
        a range of values used in the first or second traffic attribute;
        a complete overlap, wherein the first traffic attribute is subsumed in the second traffic attribute; and a partial overlap, wherein a portion of the first traffic attribute matches a portion of the second traffic attribute.

7. The computer-executable method of claim 1, wherein subsequent to removing the third traffic attribute from the second data structure, the method further comprises:
   removing a corresponding third set of allowed destination roles from the second data structure; and
   responsive to determining that a fourth traffic attribute and a fifth traffic attribute in the second data structure are identical or contiguous to each other:
      merging the fourth traffic attribute and the fifth traffic attribute into a new traffic attribute which corresponds to a union of a fourth set of allowed destination roles corresponding to the fourth traffic attribute and a fifth set of allowed destination roles corresponding to the fifth traffic attribute.

8. The computer-executable method of claim 1,
   wherein the entries in the first data structure further indicate, for the respective source role and the respective traffic attribute, a corresponding set of disallowed destination roles, and
   wherein determining that the third traffic attribute does not match the policy is based on the corresponding set of disallowed destination roles.

9. The computer-executable method of claim 1, wherein a traffic attribute comprises a plurality of attributes associated with at least one of:
   a network protocol;
   a port number;
   information associated with a configuration of the switch; and
   a characteristic of network traffic.

10. The computer-executable method of claim 1,
    wherein the first decision model takes as input, for the incoming packet, a source role, a destination role, and traffic attributes, and returns as output an action for the incoming packet, and
    wherein the second decision model takes as input, for the incoming packet, a policy sequence number, the source role, and the traffic attributes, and returns as output a set of allowed destination roles.

11. The computer-executable method of claim 1, wherein the policies in the first set of policies comprise at least one of:
    a user-configured policy; and
    a group-based policy.

12. The computer-executable method of claim 1, wherein prior to representing the policies as the matrix, the method further comprises:
    representing the first set of policies as an initial matrix, wherein a first entry in the initial matrix corresponds to the source role as a row and the destination role as a column and indicates the traffic attribute and the action of the at least one policy entry; and
    transposing the initial matrix to obtain the matrix, wherein the first entry in the initial matrix indicates same information as the first entry in the matrix.

13. A computer system, comprising:
    a processor; and
    a memory coupled to the processor and storing instructions which, when executed by the processor, cause the processor to perform a method, the method comprising:
       determining a first set of policies defined for a switch in handling a packet, wherein a policy includes at least one policy entry based on a destination role, and wherein the at least one policy entry comprises a source role, a traffic attribute, and an action to be taken for the packet;
       representing the first set of policies as a matrix, wherein a first entry in the matrix corresponds to the source role as a row and the destination role as a column and indicates the traffic attribute and the action of the at least one policy entry;
       replacing, in the first entry, the action with the destination role if the action indicates to allow the packet, and with a null value if the action indicates to deny the packet, to obtain a first data structure with entries indicating, for a respective source role, a plurality of traffic attributes and, for a respective traffic attribute, a corresponding set of allowed destination roles;
       resolving an overlapping pair comprising a first traffic attribute and a second traffic attribute to obtain a second data structure;
       determining that a third traffic attribute for a source role in the second data structure does not match a policy; and
       removing the third traffic attribute from the second data structure to obtain a second set of synthesized policies,
       wherein a first decision model based on the first set of policies yields a same result as a second decision model based on the second set of synthesized policies.

14. The computer system of claim 13, wherein prior to resolving the overlapping pair in the first data structure, the method further comprises:
    converting a wildcard value for the first traffic attribute into a set of elements with all possible values for the first traffic attribute; and
    indicating, in the first traffic attribute, a level of expansion associated with the converted wildcard value,
    wherein the level of expansion is based on at least one of:
       a list derived based on an exact value;
       a list derived based on a range of values; and
       a list derived based on a wildcard value.

15. The computer system of claim 14, wherein resolving the overlapping pair in the first data structure comprises:
    identifying three sets comprising:
       two sets of non-overlapping traffic attributes and associated allowed destination roles; and
       one set which comprises a crossover policy element derived based on a union of a first set of allowed destination roles corresponding to the first traffic attribute and a second set of allowed destination roles corresponding to the second traffic attribute;
    indicating, in each of the identified three sets, a level of expansion associated with at least one of a respective non-overlapping traffic attribute, the first traffic attribute, and the second traffic attribute; and
    replacing the overlapping pair with the identified three sets to obtain the second data structure.

16. The computer system of claim 13, wherein the method further comprises:
    detecting the overlapping pair based on at least one of:
       a wildcard used in the first or second traffic attribute;
       a range of values used in the first or second traffic attribute;
       a complete overlap, wherein the first traffic attribute is subsumed in the second traffic attribute; and
       a partial overlap, wherein a portion of the first traffic attribute matches a portion of the second traffic attribute.

17. The computer system of claim 13, wherein subsequent to removing the third traffic attribute from the second data structure, the method further comprises:
- removing a corresponding third set of allowed destination roles from the second data structure; and
- responsive to determining that a fourth traffic attribute and a fifth traffic attribute in the second data structure are identical or contiguous to each other:
- merging the fourth traffic attribute and the fifth traffic attribute into a new traffic attribute which corresponds to a union of a fourth set of allowed destination roles corresponding to the fourth traffic attribute and a fifth set of allowed destination roles corresponding to the fifth traffic attribute.

18. The computer system of claim 13,
- wherein the first decision model takes as input, for an incoming packet, a source role, a destination role, and traffic attributes, and returns as output an action for the incoming packet, and
- wherein the second decision model takes as input, for the incoming packet, a policy sequence number, the source role, and the traffic attributes, and returns as output a set of allowed destination roles.

19. A non-transitory computer-readable storage medium storing instructions that when executed by a computer cause the computer to perform a method, the method comprising:
- determining a first set of policies defined for a switch in handling a packet, wherein a policy includes at least one policy entry based on a destination role, and wherein the at least one policy entry comprises a source role, a traffic attribute, and an action to be taken for the packet;
- representing the first set of policies as a matrix, wherein a first entry in the matrix corresponds to the source role as a row and the destination role as a column and indicates the traffic attribute and the action of the at least one policy entry;
- replacing, in the first entry, the action with the destination role if the action indicates to allow the packet, and with a null value if the action indicates to deny the packet, to obtain a first data structure with entries indicating, for a respective source role, a plurality of traffic attributes and, for a respective traffic attribute, a corresponding set of allowed destination roles;
- resolving an overlapping pair comprising a first traffic attribute and a second traffic attribute to obtain a second data structure;
- determining that a third traffic attribute for a source role in the second data structure does not match a policy;
- removing the third traffic attribute from the second data structure to obtain a second set of synthesized policies, wherein a first decision model based on the first set of policies yields a same result as a second decision model based on the second set of synthesized policies; and
- allowing or denying an incoming packet at the switch to be forwarded using the second decision model,
- wherein allowing causes the switch to forward the incoming packet to a local host, and
- wherein denying causes the switch to drop the incoming packet.

20. The non-transitory computer-readable storage medium of claim 19, wherein the method further comprises:
- detecting the overlapping pair based on at least one of:
  - a wildcard used in the first or second traffic attribute;
  - a range of values used in the first or second traffic attribute;
  - a complete overlap, wherein the first traffic attribute is subsumed in the second traffic attribute; and
  - a partial overlap, wherein a portion of the first traffic attribute matches a portion of the second traffic attribute.

* * * * *